Aug. 5, 1924.

L. V. LUCIA 1,504,129

HOSE ATTACHING DEVICE

Filed Aug. 25, 1922

Inventor
Louis V. Lucia,
by Arthur B. Jenkins,
Attorney

Patented Aug. 5, 1924.

1,504,129

UNITED STATES PATENT OFFICE.

LOUIS V. LUCIA, OF HARTFORD, CONNECTICUT, ASSIGNOR TO THE FULLER BRUSH COMPANY, OF HARTFORD, CONNECTICUT, A CORPORATION OF CONNECTICUT.

HOSE-ATTACHING DEVICE.

Application filed August 25, 1922. Serial No. 584,251.

*To all whom it may concern:*

Be it known that I, LOUIS V. LUCIA, a citizen of the United States, and a resident of Hartford, in the county of Hartford and State of Connecticut, have invented new and Improved Hose-Attaching Devices, of which the following is a specification.

My invention relates to the class of devices for receiving and securing a hose for the flow of water therethrough under more or less pressure, and an object of my invention, among others, is to provide an attachment that may be readily secured in place to receive a hose in cases where there are no means to otherwise receive such hose, such instances occurring in many types of bath tubs in use at the present time.

One form of device embodying my invention and in the construction and use of which the objects herein set out, as well as others, may be attained, is illustrated in the accompanying drawings, in which—

Figure 1:
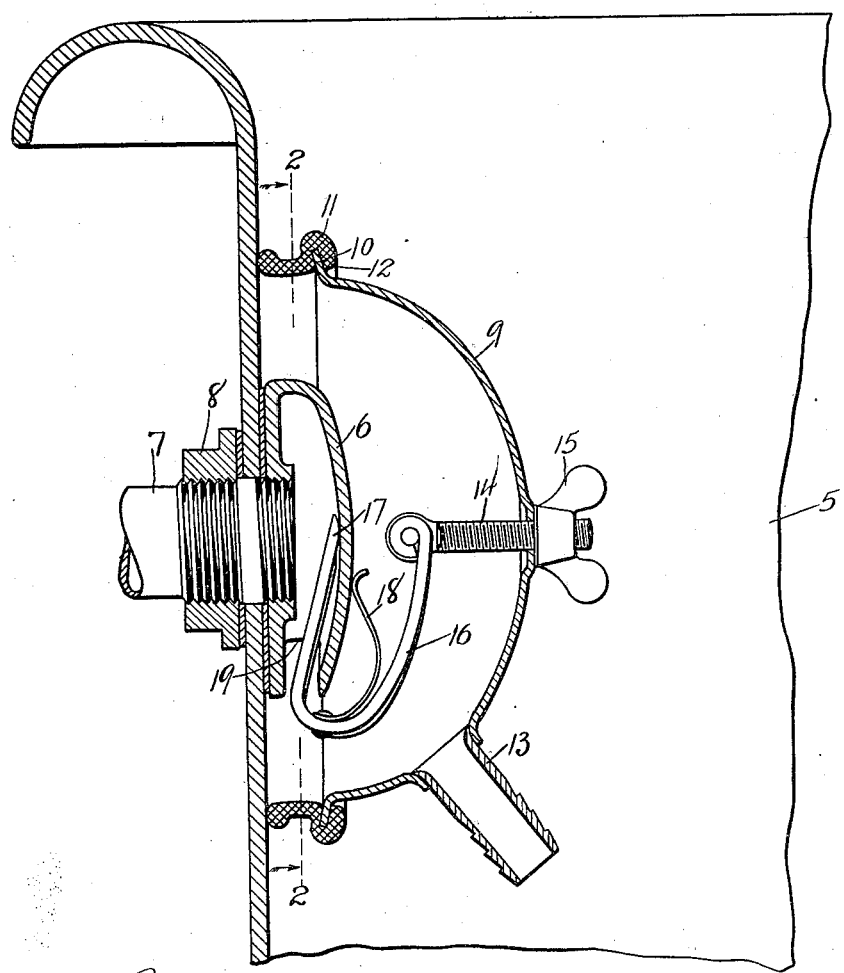
Figure 1 is a view in vertical section through a fragment of a bath tub showing my improved attaching device secured in place, said device also being cut in section.
Figure 2:
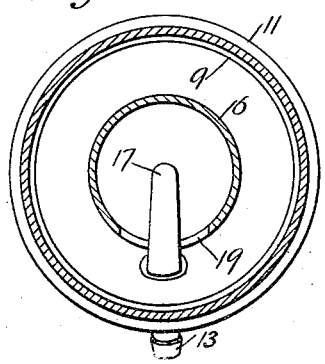
Figure 2 is a detail view, scale reduced, on a plane denoted by the dotted line 2—2 of Figure 1.

In the accompanying drawing the numeral 5 denotes a fragment of a bath tub that, as to its general construction, may be of any ordinary form and of any suitable material. Many of the bath tubs in common use heretofore, and even at the present time, are provided with a faucet or with faucets having a nipple or nipples to which a hose may be readily secured, as for the purpose of a shower, but within recent years a type of bath tub had come into use in which the inlet is through a bell-shaped or bulbous projection fixture on the inner surface of the wall of the tub and with a structure of this type no ready means for attachment of a hose is present. My improved hose attaching device, forming the subject matter of this application, provides means for the ready attachment of a hose to an inlet fixture of this kind, which fixture 6 is commonly secured to the inner end of an inlet pipe 7 extended through a wall of the tub and having a nut 8 on the outside of the tub fitting a threaded portion of the inlet pipe to clamp the wall of the tub between said nut and the fixture 6, which fixture is screwed onto the inner end of the pipe 7, and as clearly shown in Figure 1 of the drawings.

My improved attachment comprises a shell 9, preferably of semi-spherical shape, with a bounding lip 10 at its edge to be received within a packing ring 11 having a groove 12 within which said flange is tightly fitted, said ring being formed to be pressed into close contact with the inner surface of the wall of the tub. A nipple 13 projects from the shell, preferably between its center and edge, this nipple being of any suitable shape to receive and securely hold a hose, and in a manner that will be readily understood.

A clamp screw 14 projects through an opening, preferably at the center of the shell, and a clamp nut 15 is threaded upon said screw. A clamp 16 is pivotally attached to the inner end of the clamp screw, this clamp being of hook shape with a hooked end 17 shaped to project within the inlet 6 sufficiently to exert a tight hold thereon, and a retaining spring 18 is secured to the clamp as a means for holding it in place in the operation of attaching the device to the inlet 6.

In the operation of securing the device, as to a bath tub, the clamp and clamp screw are removed from the structure, and the hooked end 17 is slipped into the opening 19 in the inlet 6, the wall of which is received between the end 17 of the clamp and the spring 18, the latter holding the hook in place. There will be friction enough in the pivotal attachment of the screw 14 to the clamp to retain this screw in any position in which it may be placed. This screw, therefore, being projected substantially as shown in Figure 1, when the clamp has been placed as above described, the shell 9 may be positioned to project the screw through the opening in the shell, and the nut 15 then being screwed down the fixture will be secured in place.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim—

1. A hose attaching device comprising a shell having a hose attachment thereon, a member shaped for reception within the opening at one side of the bell-shaped inlet fixture to a receptacle, and a device attached to said member and projecting through the wall of the shell as a means for securing said member and shell in place.

2. A hose attaching device comprising a shell having a hose attachment thereon, a member shaped for reception within the opening at one side of the bell-shaped inlet fixture to a receptacle, a device attached to said member and projecting through the wall of the shell, and means secured to said device to force the shell and said member toward each other to secure said member and shell in place.

3. A hose attaching device comprising a shell having a hose attachment thereon, a member shaped for reception within the opening at one side of the bell-shaped inlet fixture to a receptacle, and a device loosely attached to said member, and projecting through the wall of the shell as a means for securing said member and shell in place.

4. A hose attaching device comprising a shell having a hose attachment thereon, a hook-shaped member formed for reception within the opening at one side of the bell-shaped inlet fixture to a receptacle, and a device attached to said member and projecting through the wall of the shell as a means for securing said member and shell in place.

5. A hose attaching device comprising a shell having a hose attachment thereon, a hook-shaped member having its hooked end formed for reception within the opening at one side of the bell-shaped inlet fixture of a receptacle, a clamp screw projecting from the opposite end of said hook-shaped member through the shell, and a clamp nut on said screw for drawing said shell toward said hooked end to secure said member and shell in place.

6. A hose attaching device comprising a shell having a hose attachment thereon, a packing ring at the edge of said shell, a member shaped for reception within the opening at one side of the bell-shaped inlet fixture of a receptacle, and a device attached to said member and projecting through the wall of the shell as a means for securing said member and shell in place.

7. A hose attaching device comprising a shell having a hose attachment thereon, a member shaped for reception within the opening at one side of the bell-shaped inlet fixture of a receptacle, means for retaining said member in engagement with said inlet, and a device attached to said member and projecting through the wall of the shell as a means for securing said member and shell in place.

8. A hose attaching device comprising a shell having a hose attachment thereon, a hook-shaped member having its hooked-end formed to be received within the opening at one side of the bell-shaped inlet fixture of a receptacle, a retaining member secured to said hook to hold it in engagement with said inlet, a clamp screw pivotally secured to the end of said member opposite the hooked-end and a clamp nut secured to said screw outside of the shell to force the shell and hooked-end of said member toward each other.

LOUIS V. LUCIA.